(12) United States Patent
Perälä et al.

(10) Patent No.: US 7,351,783 B1
(45) Date of Patent: Apr. 1, 2008

(54) COMPOSITION TO BE USED IN PAINTS

(75) Inventors: Mika Perälä, Lahti (FI); Seppo Tikkanen, Järvenpää (FI)

(73) Assignee: Nor-Maali Oy, Lahti (FI)

( * ) Notice: Subject to any disclaimer, the term of this patent is extended or adjusted under 35 U.S.C. 154(b) by 0 days.

(21) Appl. No.: 10/019,962

(22) PCT Filed: Jul. 4, 2000

(86) PCT No.: PCT/FI00/00613

§ 371 (c)(1),
(2), (4) Date: Jan. 7, 2002

(87) PCT Pub. No.: WO01/02506

PCT Pub. Date: Jan. 11, 2001

(30) Foreign Application Priority Data

Jul. 5, 1999 (FI) .................................. 991535

(51) Int. Cl.
*C08G 77/04* (2006.01)
(52) U.S. Cl. .................... 528/27; 525/476; 523/425
(58) Field of Classification Search ................ 525/474, 525/476, 477, 939; 528/25, 34, 40, 27; 523/425
See application file for complete search history.

(56) References Cited

U.S. PATENT DOCUMENTS

| | | | | |
|---|---|---|---|---|
| 3,183,198 A | * | 5/1965 | Wagner | ........................ 523/177 |
| 3,455,877 A | * | 7/1969 | Plueddemann | ................ 528/25 |
| 4,250,074 A | * | 2/1981 | Foscante et al. | ............. 523/428 |
| 4,287,326 A | | 9/1981 | Mikami | |
| 4,587,169 A | * | 5/1986 | Kistner | ........................ 428/413 |
| 4,851,481 A | | 7/1989 | Kuriyama et al. | |
| 5,492,981 A | * | 2/1996 | Hoehn et al. | ................. 525/476 |
| 5,618,860 A | * | 4/1997 | Mowrer et al. | .............. 523/421 |
| 5,703,178 A | * | 12/1997 | Gasmena | ..................... 525/476 |
| 5,705,567 A | * | 1/1998 | Iwamura et al. | ............. 525/127 |
| 5,889,124 A | | 3/1999 | Ando et al. | |
| 5,942,073 A | * | 8/1999 | Mowrer et al. | .............. 156/329 |
| 5,958,515 A | * | 9/1999 | Isshiki et al. | ................ 427/387 |
| 6,180,726 B1 | * | 1/2001 | Eklund et al. | ............... 525/408 |

FOREIGN PATENT DOCUMENTS

| | | |
|---|---|---|
| EP | 0 789057 | 8/1997 |
| WO | WO 96/16109 | 5/1996 |
| WO | WO 98/32792 | 7/1998 |
| WO | WO 00/31197 | 6/2000 |

OTHER PUBLICATIONS

Abstract of JP 11-279259. Oct. 1999 Ariyoshi et al.

* cited by examiner

*Primary Examiner*—Margaret G. Moore
(74) *Attorney, Agent, or Firm*—Young & Thompson

(57) ABSTRACT

A paint composition has a resin constituent which includes (i) a non-aromatic epoxy resin, (ii) a polysiloxane and (iii) an epoxysilane. The paint composition has an anti-corrosive effect.

12 Claims, 1 Drawing Sheet

COMPOSITION TO BE USED IN PAINTS

FIELD OF THE INVENTION

The present invention relates to an environmentally friendly, epoxy-resin-based anti-corrosive composition to be used in paints, which composition has high dry solids content and low viscosity and which can be applied to protect steel structures and/or concrete surfaces.

BACKGROUND OF THE INVENTION

Epoxy-, alkyd- and polyurethane-based paints and combinations thereof are commonly used to protect steel structures and/or concrete surfaces against corrosion. In general, polyurethane-based paints require a primer. Their greatest disadvantage, however, is related to health factors. The dry solids content of the polyurethane paints is low, which results in a great amount of volatile substances (solvents) and limits the use of said paints. Even though epoxy paints have several good properties, such as good adhesion to steel, concrete and other substrates, good mechanical strength and chemical resistance, it is necessary to use weather-resistant alkyd, or in particular, polyurethane paint for topcoating, because the epoxy paint chalks, i.e. becomes matt, and often yellows when exposed to weather. The required film thicknesses are within the range of about 150 to 500 µm, which often requires 2 to 4 repeated treatments. Even though the epoxy paints have been developed to achieve thicker films with fewer treatments and a slight improvement in the weatherability has also been achieved, the use of polyurethane as a top coat cannot have been avoided so far. The amount of volatile organic content (VOC) still constitutes a problem for both epoxy and polyurethane paints.

High viscosity has also limited the use of previously known epoxy paints. A low ambient temperature has also imposed restrictions on their use in the open air. Quite recently, reduction in viscosity and improvement in weather resistance of the epoxy paints are achieved by modifying epoxy resins with acrylic monomers and oligomers. At the same time, the use of acrylic monomers and oligomers has considerably shortened drying times and exploitation times of the paints.

Further, silicone paints and silicate paints based on organic and inorganic silicon compounds have been known for a long time. Silicone paints resist well heat, up to 600° C., but they dry poorly and yellow easily. Zinc silicate paints have often been used as a primer for demanding anti-corrosive paintings.

Polysiloxane-based paints, based on silicon and oxygen compounds, have also been developed having excellent weather resistance and particularly improved UV light resistance even as compared with the polyurethanes. However, due to their high price, these polysiloxanes acting as binders are used as a sole binder in paints only in exceptional cases, such as in space technology where requirements are extremely high. The high price has forced paint manufacturers to use silicone and siloxane compounds instead of polysiloxanes for improving and modifying the properties of other binders.

An epoxy-based polysiloxane coating composition useful for corrosion prevention is known from WO 96/16109, the composition including a non-aromatic hydrogenated epoxy resin, a polysiloxane and an organo-oxysilane. As preferred non-aromatic epoxide resins are stated hydrogenated cyclohexane dimethanol and diglycidyl ethers of hydrogenated Bisphenol A-type. When the composition dries, the non-aromatic epoxy resin used forms a straightchain epoxy polymer and not a three-dimensional structure, which is possible in the solution of the present invention. Good weather resistance of the known composition is believed to be specifically due to the linear epoxy polymer. On the other hand, it has been found that the drying times of these compositions are relatively long.

A casting resin composition used for covering optoelectronic components is known from U.S. Pat. No. 5,492,981. Said US patent thus relates to a field of use which is different from the field of use of the present invention. For instance, the hardener type and the curing temperature cited in said patent publication indicate that the known composition in question is not related to paints in any manner whatsoever. The resin component of the casting resin composition according to the US patent contains 5 to 95% by weight of a condensation product which is an epoxy group containing polysiloxane formed of a silanol and an epoxyalkoxysilane at an elevated temperature. According to the publication, the resin component also contains 5 to 95% by weight of epoxy resin. The solution of the present invention, in turn, uses polysiloxane, which does not include epoxy groups, and separately epoxy silane and aliphatic epoxy resin.

The object of the invention is thus to provide a low-viscosity anti-corrosive paint composition which avoids the problems of the corresponding, known epoxy-based paint compositions. The present invention is based on the use of a combination of aliphatic epoxy constituents and specific polysiloxane-containing constituents. Now, it has been found that a paint composition having excellent properties is obtained by using epoxy silane, instead of organo-oxysilane (cf. WO 96/16109), together with an aliphatic epoxy resin. The composition of the invention has an advantage that it has low viscosity, whereby diluting is not generally needed, and that it dries quickly also at low temperatures, even at –5° C. The drying rate and curing at low temperatures of known epoxy compositions can be improved by specific accelerators, which, however, do not act at the same temperatures or they cause other problems, such as more intense yellowing than conventionally and matting (chalking) of a painted surface. These accelerators can also be toxic, for instance, phenol derivatives.

The compositions of the invention have a further advantage that it is possible to apply new coatings over the paints containing said compositions after a long time without that any adhesion or curling problems occur. They need not be coated with a separate weather-resistant topcoat either, film thicknesses can be reduced in many cases and the intervals between maintenance paintings can be prolonged, which in turn reduces costs.

SUMMARY OF THE INVENTION

The present invention relates to a composition to be used in paints, which is characterized by comprising a resin constituent which includes i) a non-aromatic epoxy resin,
ii) a polysiloxane having the formula:

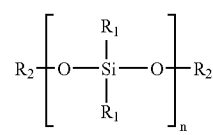

where $R^1$ is hydroxyl or an alkyl, aryl or alkoxy group having up to 6 carbon atoms, $R^2$ is a hydrogen or an alkyl or aryl group having up to 6 carbon atoms and n is a number selected so that the molar mass of the polysiloxane is within the range of 400 to 2000, and iii) an epoxy silane which acts as a crosslinking agent between the epoxy and siloxane chains.

The invention also relates to a kit, which is characterized by comprising a container A, which contains a composition of the present invention, and a container B, which contains a hardening agent, whereby the container A and/or B may further contain conventional additives. The additives may include accelerators, water and other conventional additives.

DETAILED DESCRIPTION OF THE INVENTION

Figure 1:
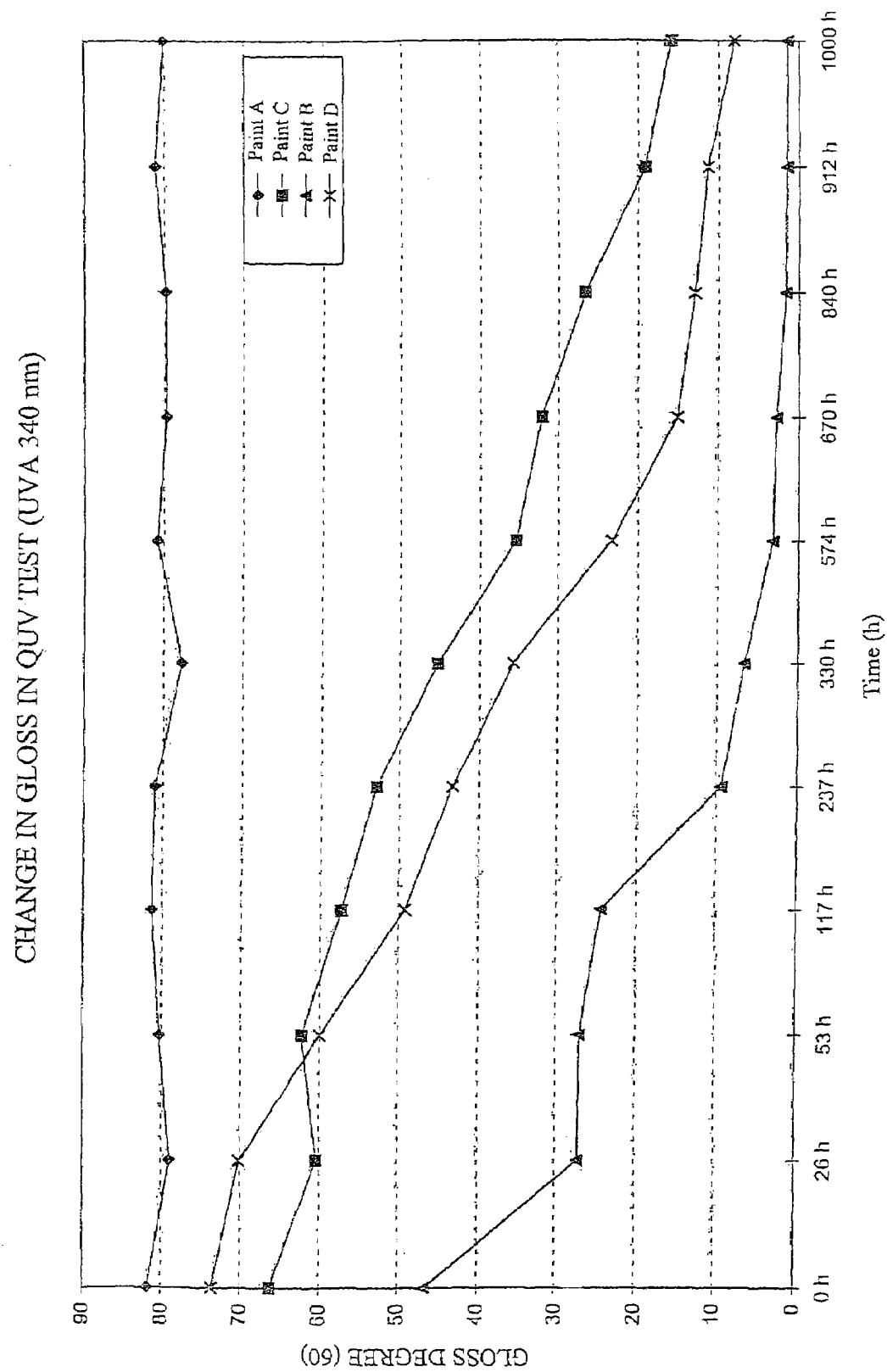
FIG. 1 shows the charge in glass of several paint compositions subjected to a QUV test.

In the composition of the invention, the non-aromatic epoxy resin is preferably an aliphatic branched epoxy resin. A suitable branched aliphatic epoxy resin has the general formula:

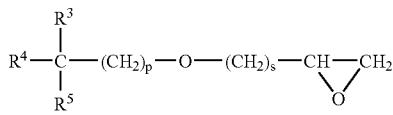

where p is an integer between 0 and 3, s is an integer between 1 and 3, $R^3$ and $R^4$ represent independently $C_{1-6}$alkyl or a group

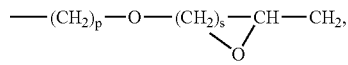

where p and s are as defined above and $R^5$ is hydrogen, $C_{1-6}$alkyl or a group

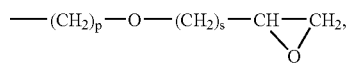

where p and s are as defined above.

The preferred branched aliphatic epoxy resins include

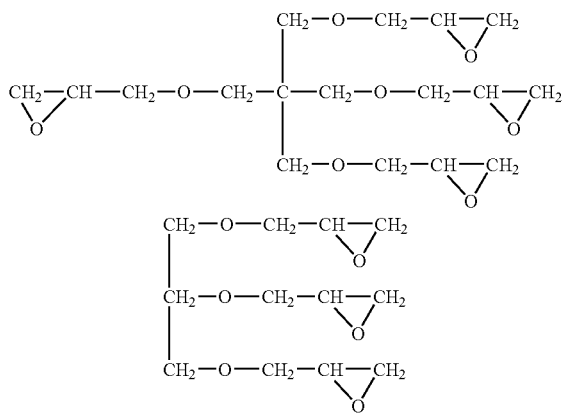

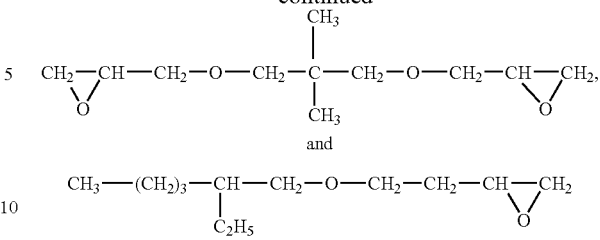

and

Polysiloxanes described in WO 96/16109 can be generally used as a polysiloxane constituent of the resin component in the compositions of the invention. Particularly preferable are substances under commercial names DC-3074 and DC-3037 available from the manufacturer Dow Corning, which are methoxy functional polysiloxanes. The amount of polysiloxane in the paint composition is 15 to 45% by weight.

Suitable epoxy silanes include those having the general formula:

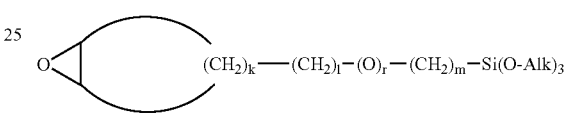

where k is an integer between 0 and 4, l is an integer between 1 and 6, r is 0 or 1, m is an integer between 1 and 6 and Alk is an alkyl group having 1 to 6 carbon atoms. Particularly preferable epoxy silanes are glycidoxypropyl-trimethoxysilane having the formula

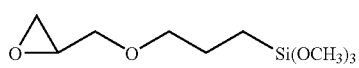

and β-(3,4-epoxycyclohexyl)-ethyltrimethoxysilane having the formula

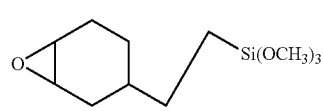

In the composition of the invention the weight ratio between the epoxy silane, polysiloxane and non-aromatic epoxy resin is suitably 1:2-5:2-5.

In connection with the present invention, conventional hardening agents can be used as hardeners. Such hardeners include, for instance, amines, aliphatic amines, aliphatic amine adducts, polyamidoamines, cycloaliphatic amines and adducts thereof, aromatic amines, Mannich bases and ketimines all of which may be substituted wholly or in part with aminosilanes. Amine hardeners useful for the present invention are described in WO 96/16109, for instance.

Organic tin compounds, such as dibutyl tin dilaurate (DBTL) or organic salts, for instance naphthanates, of some metals, such as cobalt, zinc, manganese, iron and lead, can be used as an accelerator in the compositions of the invention.

Water can be included in the compositions of the invention, either separately added or in the form of water present in the ingredients. The amount of water is about 1% by weight of the total weight of the paint.

The compositions of the invention may also include other commonly used paint ingredients, such as pigments, fillers, additives such as tixotropic substances, softeners, solvents, et cetera, to achieve the properties desired by the user.

Following advantages, for instance, are achieved by using epoxy silane instead of organo-oxysilane in the composition of the invention:

epoxy silane has properties improving paint adhesion,
epoxy silane acts as a crosslinking agent between the epoxy and siloxane chains,
when using epoxy silane in a siloxane reaction, the amount of alcohol liberated in the reaction in relation to the molecular weight is considerably lower than when using organo-oxysilane. Consequently, a higher dry solids content and a lower amount of volatile organic compounds (VOC) can be achieved.
epoxy silane reduces the viscosity of the paint,
epoxy silane also has a modifying effect on functional fillers, such as wollastonite, whereby strength and anti-corrosive properties improve.

The following examples illustrate the invention.

EXAMPLE 1 (PAINT A, REFERENCE)

Preparation of a Polyurethane Paint

A resin and pigment blend was prepared by first combining 200 g of hydroxyl polyacrylate (Desmophen 365™, equivalent weight 607, manufactured by Bayer) and 10 g of bentonite-based thickener (Bentone 38™, manufactured by Rheox) and blending for about 10 minutes, whereafter 250 g of titanium dioxide pigment and 25 g of barium sulphate filler were added. The mixture was ground to 20 μm fineness of grind at a dispersing temperature of about 50° C. The paint was completed by adding the rest of the binder (200 g) and 70 g of butyl acetate and 87 g of xylene to achieve the desired viscosity.

The hardener was prepared by mixing 84.65 g of polyisocyanate (Desmodur N 75™, equivalent weight 255) and 15.30 g of butyl acetate.

The specific weight of the paint was 1.31 kg/dm$^3$ (1.01 equivalents per dm$^3$) and the specific weight of the hardener was 1.04 kg/dm$^3$ (3.47 equivalents per dm$^3$).

EXAMPLE 2 (PAINT B, REFERENCE)

Preparation of an Epoxy Paint

A resin and pigment blend was prepared by combining 307.5 g of liquid Bisphenol-A epoxy resin (Dow DER 331™, equivalent weight 190), 34 g of benzoic alcohol and 34 g of xylene to achieve the desired viscosity and 8.5 g of polyamide wax thickener (Crayvallac Super™). After mixing the blend for about 10 minutes, 134 g of titanium dioxide pigment and 278.5 g of feldspar filler (Siokal FF 30™) were added. Thereafter the mixture was dispersed with a laboratory dissolver at a temperature of 55° C. where it was allowed to stay for 15 to 20 minutes. The required fineness of grind was 50 μm. The paint was completed by adding the solvents: 21.5 g of butanol and 33 g of xylene.

The hardener was prepared by combining 188.5 g of hydrocarbon resin (Necires EXP-L™) and 4.9 g of polyamide wax thickener (Crayvallac Super™). The blend was allowed to mix for about 10 minutes, whereafter 184.5 g of isophoron diamine epoxy adduct, 250 g of talcum and 58 g of xylene were added. Thereafter, the blend was dispersed with a laboratory dissolver at a temperature of 55° C. where it was allowed to stay for 15 to 20 minutes. The required fineness of grind was 50 μm. The hardener was completed by adding the solvents: 25 g of butanol and 51 g of xylene.

The specific weight of the paint was 1.55 kg/dm$^3$ (2.94 equivalents per dm$^3$) and the specific weight of the hardener was 1.29 kg/dm$^3$ (2.85 equivalents per dm$^3$).

EXAMPLE 3 (PAINT C, PRESENT INVENTION)

Preparation of an Epoxy Polysiloxane Paint

A resin and pigment blend was prepared by combining 306 g of methoxy-functional polysiloxane (Dow Corning 3074™) and 21.3 g of polyamide wax thickener (Crayvallac Super™). After allowing the blend to mix, 156 g of titanium dioxide pigment, 30 g of talcum, 54.5 g of wollastonite, 49 g of feldspar filler (Siokal FF 30™) were added. Thereafter the blend was dispersed with a laboratory dissolver at a temperature of 65° C. The required fineness of grind was 40 μm. The paint was completed by adding 50.6 g of glycidoxypropyltrimethoxysilane (Silquest A-187™) and 268.5 g of pentaerythritepolyglycidylether (Polypox R 16™).

The hardener was prepared by combining 173 g of polyamide (Versamid 140™) and 33.9 g of aliphatic epoxy resin (Dow DER 732™, equivalent weight 320). The obtained adduct was allowed to react for 24 hours at room temperature, whereafter 404 g of γ-aminopropyltriethoxysilane (Silquest A-1100™) and 16.2 g of tin catalyst (DBTL) were added.

The specific weight of the paint was 1.46 kg/dm$^3$ (2.80 equivalents per dm$^3$) and the specific weight of the hardener was 0.97 kg/dm$^3$ (8.19 equivalents per dm$^3$).

EXAMPLE 4 (PAINT D, PRESENT INVENTION)

Preparation of an Epoxy Polysiloxane Paint

Example 3 was repeated, except that 52.7 g of β-(3,4-epoxycyclohexyl)-ethyltrimethoxysilane (Silquest A-186™) was used as the epoxy silane.

The hardener was prepared by combining 217 g of polyamide and 43.5 g of aliphatic epoxy resin (Dow DER 732™, equivalent weight 320). The obtained adduct was allowed to react for 24 hours at room temperature, whereafter 381 g of N-(β-aminoethyl)-γ-aminopropyltrimethoxysilane (Silquest A-1120™) and 19.8 g of tin catalyst were added.

The specific weight of the paint was 1.46 kg/dm$^3$ (2.79 equivalents per dm$^3$) and the specific weight of the hardener was 1.02 kg/dm$^3$ (11.17 equivalents per dm$^3$).

The specific weight of the paint was 1.46 kg/dm$^3$ (2.79 equivalents per dm$^3$) and the specific weight of the hardener was 1.02 kg/dm$^3$ (11.17 equivalents per dm$^3$).

Weather Resistance

In an ultraviolet tolerance test, the weather resistance of polyurethane paint A, epoxy paint B and epoxy polysiloxane paints C and D were compared.

The test was conducted with a QUV/spray-type test equipment. The lamps used were lamps transmitting long-wave ultraviolet radiation (UVA 340 nm). The equipment was run as follows: 4 h UV (T=60° C.), 4 h condensation (T=40° C.). The test results are presented in the attached FIG. 1.

The obtained results show that the epoxy polysiloxane paint has improved resistance to ultraviolet light as compared with the conventional epoxy paint. An average 50% gloss reduction occurred in 640 hours in the epoxy polysiloxane paints, whereas in the epoxy paints it occurred as early as in 120 hours from the beginning of the test. Gloss retention was clearly best in the polyurethane paint.

Adhesion in Corrosion Stress

Epoxy paint B and epoxy polysiloxane paint C were exposed to a neutral salt fog test according to SFS 3707 standard. Paint adhesion to a substrate before and after the test indicates the protection performance of the system in extremely severe conditions (pre-treatment: Sa 2½, sheet thickness 5 mm). The test results are presented in Table 1.

TABLE 1

| Paint | Film thickness (μm) | Tensile value (MPa) before test | Tensile value (MPa) after test |
|---|---|---|---|
| C | 120 | 14.3 | 7.3 |
| B | 200 | 12.3 | 3.5 |

The invention claimed is:

1. A paint composition comprising:
a resin constituent consisting essentially of
i) a non-aromatic epoxy resin having the formula:

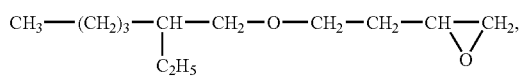

ii) a polysiloxane having the formula:

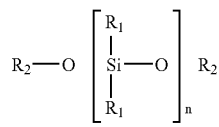

where $R^1$ is a hydroxyl or an alkyl, aryl or alkoxy group having up to 6 carbon atoms, $R^2$ is a hydrogen or an alkyl or aryl group having up to 6 carbon atoms and n is a number selected so that the molar mass of the polysiloxane is within the range of 400 to 2000, and
iii) an epoxy silane which acts as a crosslinking agent between the epoxy and siloxane chains.

2. The composition as claimed in claim 1, wherein the weight ratio between the epoxy silane, polysiloxane and non-aromatic epoxy resin is 1:2-5:2-5.

3. The composition as claimed in claim 1, wherein the epoxy silane has the formula

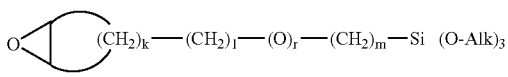

where k is an integer between 0 and 4, r is 0 or 1, l is an integer between 1 and 6, m is an integer between 1 and 6 and Alk is an alkyl group having 1 to 6 carbon atoms.

4. The composition as claimed in claim 3, wherein the epoxy silane has the formula

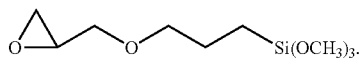

5. The composition as claimed in claim 3, wherein the epoxy silane has the formula

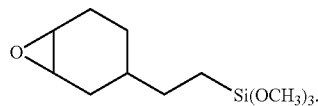

6. A kit, comprising a container A, which contains a composition according to claim 1, and a container B, which contains a hardener.

7. A paint composition comprising:
a) a pigment, and
b) a resin constituent consisting essentially of
i) a non-aromatic epoxy resin having the formula:

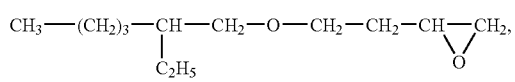

ii) a polysiloxane having the formula:

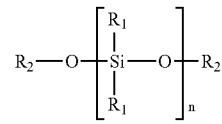

wherein $R^1$ is a hydroxyl or an alkyl, aryl or alkoxy group having up to 6 carbon atoms, $R^2$ is a hydrogen or an alkyl or aryl group having up to 6 carbon atoms and n is a number selected so that the molecular weight of the polysiloxane is within the range of 400 to 2000, and
iii) an epoxy silane which acts as a cross-linking agent between the epoxy and siloxane chains.

8. The composition as claimed in claim 7, wherein the weight ratio between the epoxy silane, polysiloxane and non-aromatic epoxy resin is 1:2-5:2-5.

9. The composition as claimed in claim 7, wherein the epoxy silane has the formula

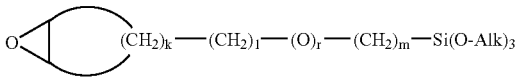

where k is an integer between 0 and 4, r is 0 or 1, l is an integer between 1 and 6, m is an integer between 1 and 6 and Alk is an alkyl group having 1 to 6 carbon atoms.

10. The composition as claimed in claim 9, wherein the epoxy silane has the formula

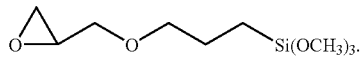

11. The composition as claimed in claim 9, wherein the epoxy silane has the formula

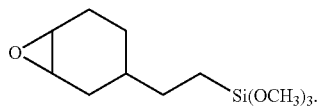
12. A kit, comprising a container A, which contains a composition according to claim 7, and a container B, which contains a hardener.
* * * * *